United States Patent
Plasmeier et al.

(10) Patent No.: US 10,831,766 B2
(45) Date of Patent: Nov. 10, 2020

(54) DECENTRALIZED CARDS PLATFORM FOR SHOWING CONTEXTUAL CARDS IN A STREAM

(71) Applicant: Oath Inc., New York, NY (US)

(72) Inventors: Michael Plasmeier, Mountain View, CA (US); Paul Montoy-Wilson, Palo Alto, CA (US); Bernat Fortet-Unanue, San Francisco, CA (US); Naroo Krishnan, Sunnyvale, CA (US); Abhay Gupta, Los Altos, CA (US); Mark Daiss, Sunnyvale, CA (US)

(73) Assignee: Oath Inc., New York, NY (US)

( * ) Notice: Subject to any disclaimer, the term of this patent is extended or adjusted under 35 U.S.C. 154(b) by 190 days.

(21) Appl. No.: 14/977,390

(22) Filed: Dec. 21, 2015

(65) Prior Publication Data
US 2017/0177582 A1    Jun. 22, 2017

(51) Int. Cl.
| | |
|---|---|
| *G06F 3/048* | (2013.01) |
| *G06F 16/2457* | (2019.01) |
| *G06F 16/24* | (2019.01) |
| *G06F 16/25* | (2019.01) |
| *G06F 16/958* | (2019.01) |
| *H04L 29/08* | (2006.01) |
| *G06F 9/451* | (2018.01) |
| *H04L 29/06* | (2006.01) |

(52) U.S. Cl.
CPC ........ *G06F 16/24578* (2019.01); *G06F 9/451* (2018.02); *G06F 16/24* (2019.01); *G06F 16/25* (2019.01); *G06F 16/958* (2019.01); *H04L 67/02* (2013.01); *H04L 67/10* (2013.01); *H04L 67/1097* (2013.01); *H04L 67/42* (2013.01)

(58) Field of Classification Search
CPC .......... G06F 17/3053; G06F 17/30386; G06F 17/30557; G06F 3/048; G06F 9/4443; H04L 67/42; H04L 67/02
See application file for complete search history.

(56) References Cited

U.S. PATENT DOCUMENTS

| | | |
|---|---|---|
| 6,271,840 B1 | 8/2001 | Finseth et al. |
| 7,581,188 B2 | 8/2009 | Hiles et al. |
| 8,188,936 B2 | 5/2012 | Fuller et al. |
| 8,433,800 B2 | 4/2013 | Chor |

(Continued)

FOREIGN PATENT DOCUMENTS

CN        102870065 A       1/2013

OTHER PUBLICATIONS

U.S. Office Action dated Oct. 5, 2017 issued in U.S. Appl. No. 14/921,983.

(Continued)

*Primary Examiner* — Jeanette J Parker
(74) *Attorney, Agent, or Firm* — Cooper Legal Group, LLC

(57) ABSTRACT

Disclosed are methods and apparatus for receiving by one or more servers, from a client device, a context of the client device. The servers may obtain, from a plurality of user interface object providers, a plurality of user interface objects. The servers may select and rank a set of the plurality of user interface objects based, at least in part, on the context of the client device. The servers may transmit the set of the plurality of user interface objects or information associated therewith to the client device according to the ranking of the set of user interface objects.

27 Claims, 8 Drawing Sheets

(56) References Cited

U.S. PATENT DOCUMENTS

| | | | |
|---|---|---|---|
| 8,438,245 | B2 | 5/2013 | Chor |
| 8,843,477 | B1 | 9/2014 | Tirumalareddy et al. |
| 9,058,332 | B1* | 6/2015 | Darby ................. G06F 16/2228 |
| 9,442,946 | B1* | 9/2016 | Yuan ................... G06F 17/3012 |
| 9,678,637 | B1 | 6/2017 | Brothers et al. |
| 10,387,524 | B2* | 8/2019 | O'Connell, Jr. ...... G06F 16/958 |
| 2003/0046401 | A1 | 3/2003 | Abbott et al. |
| 2006/0136832 | A1 | 6/2006 | Keller et al. |
| 2006/0184617 | A1 | 8/2006 | Nicholas |
| 2008/0146245 | A1 | 6/2008 | Appaji |
| 2008/0189360 | A1 | 8/2008 | Kiley |
| 2008/0276182 | A1 | 11/2008 | Leow |
| 2009/0061841 | A1 | 3/2009 | Chaudhri et al. |
| 2009/0265646 | A1 | 10/2009 | Cho et al. |
| 2009/0288022 | A1 | 11/2009 | Almstrand et al. |
| 2009/0322650 | A1 | 12/2009 | Kakie |
| 2010/0332518 | A1 | 12/2010 | Song et al. |
| 2011/0126050 | A1 | 5/2011 | Begole et al. |
| 2011/0131506 | A1 | 6/2011 | Calissendorff |
| 2011/0214077 | A1 | 9/2011 | Singh et al. |
| 2011/0246918 | A1 | 10/2011 | Henderson |
| 2012/0011511 | A1 | 1/2012 | Horvitz et al. |
| 2012/0021774 | A1 | 1/2012 | Mehta et al. |
| 2012/0036453 | A1 | 2/2012 | Appel |
| 2012/0095979 | A1 | 4/2012 | Aftab et al. |
| 2012/0137235 | A1* | 5/2012 | T S ........................ G06F 8/34 715/763 |
| 2012/0138671 | A1 | 6/2012 | Gaede |
| 2012/0140255 | A1 | 6/2012 | Tanaka |
| 2012/0158472 | A1 | 6/2012 | Singh et al. |
| 2012/0317504 | A1 | 12/2012 | Patel et al. |
| 2012/0324434 | A1 | 12/2012 | Tewari et al. |
| 2013/0014040 | A1 | 1/2013 | Jagannathan et al. |
| 2013/0024796 | A1 | 1/2013 | Seo |
| 2013/0080890 | A1 | 3/2013 | Krishnamurthi |
| 2013/0132896 | A1 | 5/2013 | Lee et al. |
| 2013/0166527 | A1 | 6/2013 | Kasterstein et al. |
| 2013/0172021 | A1 | 7/2013 | Karmarkar et al. |
| 2013/0187753 | A1 | 7/2013 | Chiriyankandath |
| 2013/0275915 | A1 | 10/2013 | Wang |
| 2013/0304608 | A1* | 11/2013 | Mehta ................. G06Q 30/0282 705/26.7 |
| 2013/0305218 | A1* | 11/2013 | Hirsch ....................... G06F 8/30 717/106 |
| 2013/0332518 | A1 | 12/2013 | Chor |
| 2013/0332886 | A1 | 12/2013 | Cranfill et al. |
| 2013/0346347 | A1 | 12/2013 | Patterson et al. |
| 2014/0037107 | A1 | 2/2014 | Marino, Jr. et al. |
| 2014/0071036 | A1 | 3/2014 | Blue |
| 2014/0089382 | A1 | 3/2014 | Wang et al. |
| 2014/0120961 | A1 | 5/2014 | Buck |
| 2014/0143196 | A1 | 5/2014 | White et al. |
| 2014/0146074 | A1 | 5/2014 | Kwon |
| 2014/0169641 | A1 | 6/2014 | Lee et al. |
| 2014/0188956 | A1 | 7/2014 | Subba et al. |
| 2014/0201655 | A1 | 7/2014 | Mahaffey et al. |
| 2014/0201681 | A1* | 7/2014 | Mahaffey .......... H04M 1/72569 715/846 |
| 2014/0298248 | A1* | 10/2014 | Kang ....................... G06F 3/0482 715/781 |
| 2015/0065170 | A1 | 3/2015 | Brisebois |
| 2015/0100552 | A1 | 4/2015 | Malis et al. |
| 2015/0106737 | A1 | 4/2015 | Montoy-Wilson et al. |
| 2015/0163121 | A1* | 6/2015 | Mahaffey ............ G06F 11/0766 707/687 |
| 2015/0248193 | A1 | 9/2015 | Fujioka |
| 2015/0296072 | A1 | 10/2015 | Zhou et al. |
| 2016/0077674 | A1 | 3/2016 | Forster et al. |
| 2016/0077808 | A1* | 3/2016 | Friedman ................. G06F 8/30 717/104 |
| 2016/0092071 | A1 | 3/2016 | Lawson et al. |
| 2016/0247110 | A1 | 8/2016 | Sinha |
| 2016/0284321 | A1 | 9/2016 | Cho |
| 2017/0090690 | A1 | 3/2017 | Chor |
| 2017/0115848 | A1 | 4/2017 | Plasmeier |
| 2017/0118201 | A1* | 4/2017 | Hoyer ................. H04L 63/0838 |

OTHER PUBLICATIONS

U.S. Office Action dated Oct. 6, 2016 issued in U.S. Appl. No. 14/513,079.

U.S. Final Office Action dated May 3, 2017 issued in U.S. Appl. No. 14/513,079.

U.S. Office Action dated Apr. 4, 2018 issued in U.S. Appl. No. 14/513,079.

WO International Search Report and Written Opinion dated Jan. 29, 2015, issued in Application No. PCT/US2014/060310.

WO International Preliminary Report on Patentability dated Apr. 19, 2016, issued in Application No. PCT/US2014/060310.

WO International Search Report and Written Opinion dated Mar. 27, 2017, issued in Application No. PCT/US2016/056149.

WO International Search Report and Written Opinion dated Feb. 17, 2017, issued in Application No. PCT/US2016/066411.

CN Office Action dated Jan. 25, 2018, issued in Application No. 201480055431.6, (no translation).

EP Extended Search Report dated Jun. 7, 2017, issued in Application No. 14854058.6.

U.S. Appl. No. 13/966,118, Notice of Allowance dated Feb. 16, 2016.

Amazon, "Getting started with the Alexa Skills Kit," downloaded from https://developer.amazon.com/public/solutions/alexa/alexa-skills-kit/getting-started-guide, © Amazon.com, Inc. 2010-2014.

Wikipedia, "Amazon Echo," downloaded from https://en.wikipedia.org/wiki/Amazon_Echo, last modified Apr. 9, 2016.

EverythingMe Launcher by EverythingMe, "Get the most out of your phone," Dec. 2010, downloaded from http://everything.me/.

Yahoo! Aviate, "The intelligent homescreen that simplifies your phone," Nov. 24, 2014, downloaded from http://aviate.yahoo.com/.

U.S. Final Office Action dated May 22, 2018 issued in U.S. Appl. No. 14/921,983.

U.S. Office Action dated Nov. 16, 2018 issued in U.S. Appl. No. 14/921,983.

U.S. Final Office Action dated Oct. 23, 2018 issued in U.S. Appl. No. 14/513,079.

U.S. Office Action dated May 15, 2018 issued in U.S. Appl. No. 14/867,755.

U.S. Final Office Action dated Jan. 11, 2019 issued in U.S. Appl. No. 14/867,755.

WO International Preliminary Report on Patentability dated Apr. 24, 2018, issued in Application No. PCT/US2016/056149.

WO International Preliminary Report on Patentability dated Jun. 26, 2018, issued in Application No. PCT/US2016/066411.

CN Office Action dated Oct. 15, 2018, issued in Application No. 201480055431.6.

Wilbert O. Galitz, The Essential Guide to User Interface Design: An Introduction to GUI Design Principles and Techniques, 3rd Edition, Apr. 16, 2007, John Wiley & Sons, All pages. (Year: 2007).

WO patent application No. PCT/US2014/060310, International Search Report and Written Opinion dated Jan. 29, 2015.

U.S. Appl. No. 14/513,079, "Systems and methods for providing context-based user interface," Montoy-Wilson et al., filed Oct. 13, 2014.

U.S. Appl. No. 14/921,983, "Method to automatically update a homescreen," Michael Plasmeier, filed Oct. 23, 2015.

U.S. Appl. No. 14/867,755, "Continuity of experience card for index," Jesse Chor, filed Sep. 28, 2015.

Kasterstein, Rami et al., "EverythingMe Launcher," Nov. 2010, downloaded from http://everything.me/.

"Yahoo! Aviate," Nov. 24, 2014, downloaded from http://aviate.yahoo.com/.

Kazmucha, Allyson, "IOS 8 Tips—how to enable and disable app suggestions in iOS 8," Sep. 17, 2014, downloaded from http://www.imore.com/how-enable-and-disable-app-suggestions-ios-8.

\* cited by examiner

DECENTRALIZED CARDS PLATFORM FOR SHOWING CONTEXTUAL CARDS IN A STREAM

BACKGROUND OF THE INVENTION

The present disclosure relates generally to computer implemented methods and apparatus for presenting information including content according to a context of a client device.

When a user wishes to find information, the user may search for the desired information on the Internet using a web browser. Using their web browser, the user may navigate to various information resources. Each information resource may be identified by a Uniform Resource Locator (URL). For example, an information resource may be a web page, image, video, or other piece of content. Hyperlinks within information resources enable the user to navigate their web browser to related information resources. As a result, a user often spends a significant amount of time and effort to locate and retrieve the sought after information.

SUMMARY OF THE INVENTION

In one embodiment, one or more servers may receive, from a client device, a context of the client device. The servers may obtain, from a plurality of user interface object providers, a plurality of user interface objects. The servers may select and rank a set of the plurality of user interface objects based, at least in part, on the context of the client device. The servers may transmit the set of the plurality of user interface objects or information associated therewith to the client device according to the ranking of the set of user interface objects.

In another embodiment, the invention pertains to a device comprising a processor, memory, and a display. The processor and memory are configured to perform one or more of the above described method operations. In another embodiment, the invention pertains to a computer readable storage medium having computer program instructions stored thereon that are arranged to perform one or more of the above described method operations.

These and other features and advantages of the present invention will be presented in more detail in the following specification of the invention and the accompanying figures which illustrate by way of example the principles of the invention.

DETAILED DESCRIPTION OF THE SPECIFIC EMBODIMENTS

Figure 1:
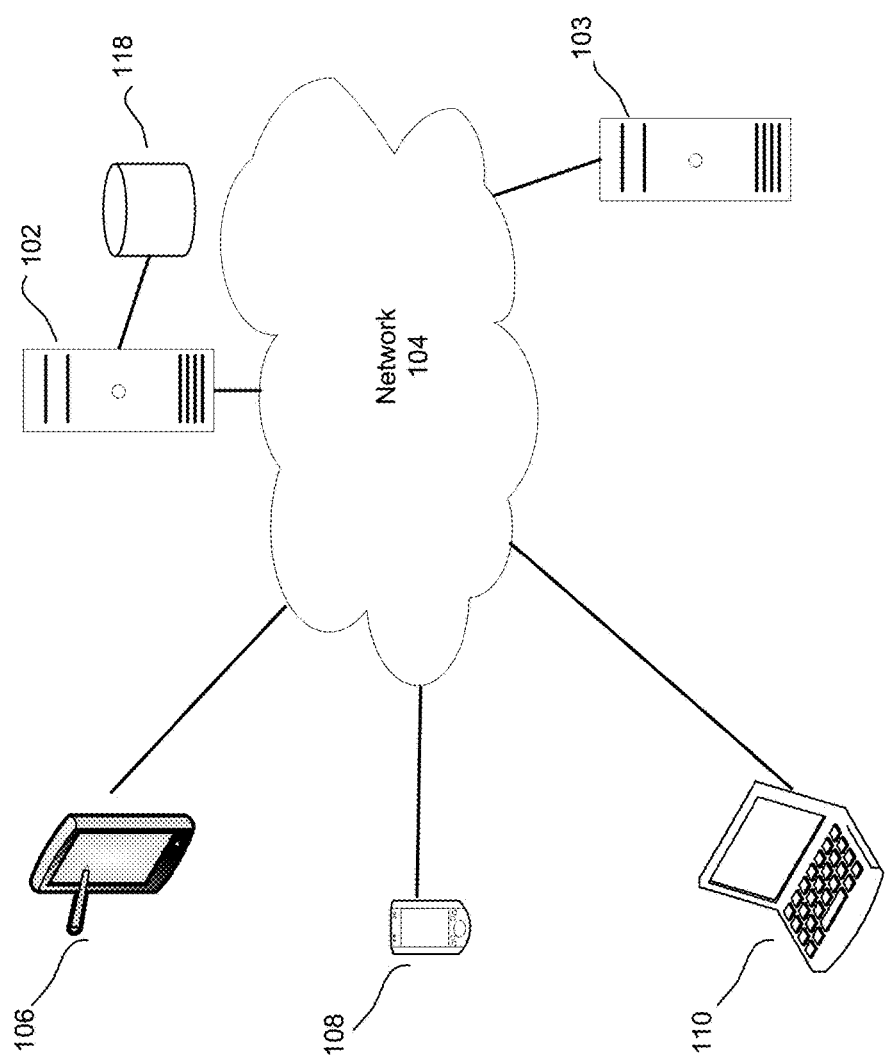
FIG. 1 is a block diagram illustrating an example system in which various embodiments may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the,"

again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

A user may search for desired information on the Internet using a web browser. In addition, a user may attempt to locate the desired information locally within their client device. This may involve navigating among folders and files stored on the client device. Alternatively, where the client device is a mobile device, a user may search for information by navigating within a homescreen of their device.

Generally, a homescreen of a mobile device displays icons representing applications according to a grid. More particularly, the grid may be defined by a fixed number of rows and/or columns, where each row or column may include a maximum number of icons. In some instances, the icons within the grid may be displayed with the same horizontal and vertical dimensions. For example, the grid may be a 5×4 grid that includes five rows and four columns, enabling a maximum of 20 icons to be displayed within the grid.

An icon within a homescreen may also represent a tile or set of tiles, which may also be referred to as cards or "user interface objects." For example, an icon may represent a folder in which multiple tiles are maintained. Thus, an icon may represent a single tile or a collection of tiles. A collection of tiles may also be referred to as a "stack" of cards. To view a card or "stack" of cards, the user may click on the icon, which may produce a larger, "full-size" version of a card (e.g., the card at the top of the stack).

User interfaces such as homescreens generally do not change based upon the context of the client device. For example, a homescreen is not typically modified based upon whether a user is at home or at work. Rather, to modify a user interface of a client device, a user may download applications, organize icons corresponding to downloaded applications, or delete downloaded applications from their client device.

In the following description, the terms "user interface object" and "card" will be used interchangeably. Generally, a card may include any graphical representation or user interface with which a user may interact. For example, a card may include an icon representing an application, an icon representing content, a web page, content such as text and/or images, a folder containing content (e.g., a stack of cards), a folder containing applications, and/or another graphical representation or user interface. A card may be used to present content pertaining to a particular topic or theme. For example, the content may include information pertaining to a topic or recommendation such as a movie or restaurant. As another example, the content may include a list of topics or recommendations such as nearby restaurants.

Each card may be displayed via a corresponding set of computer-readable code. For example, a card may be generated (e.g., instantiated) and stored in a language such as an object-oriented language. In some instances, a card may include computer-readable instructions for presenting content. For example, the computer-readable instructions may define a layout in which content is to be presented. In other instances, a card may include a Uniform Resource Locator (URL) via which content is to be retrieved and presented.

A card may include one or more user interface elements that facilitate the presentation of content such as text, images, audio, and/or video. The content may be accessed via the Internet, retrieved from memory of the client device, or otherwise accessed by the client device. Example user interface elements include, but are not limited to, a title, a heading, an image, a table, controls (e.g., drawers, check boxes, buttons such as radio buttons, drop down select), filters, search boxes, and/or search refinements.

The disclosed embodiments enable cards to be obtained and presented via a decentralized, distributed cards platform. For example, the cards platform may transmit cards to a client device such as a mobile device. As will be described in further detail below, cards may be identified and presented within the context of the client device.

In accordance with various embodiments, the cards platform may stream cards over the Internet. Streaming is a technique for transferring data so that it can be processed as steady and continuous stream. Streaming technologies are becoming increasingly important with the growth of the Internet. With streaming, the web browser or plug-in of the client device can receive real-time updates that can be presented via the client device.

A decentralized, distributed cards platform may be implemented via one or more servers and/or one or more client devices. An example system via which the disclosed embodiments may be implemented will be described in further detail below with reference to FIG. 1.

FIG. 1 is a diagram illustrating an example system in which various embodiments may be implemented. The disclosed embodiments may be implemented in some centralized manner. This is represented in FIG. 1 by server(s) 102, which may correspond to multiple distributed devices and data store(s). The server(s) 102 and/or corresponding data store(s) 118 may store user account data, user information such as user profiles, query logs, search logs, content, and/or cards.

The server(s) 102 may be associated with a web site that provides a variety of services to its users. More particularly, the server(s) 102 may include a web server, electronic mail server, search server, and/or content server. As will be described in further detail below, a Cards Platform may facilitate the selection and/or generation of cards, which may be transmitted and displayed via client devices 106, 108, 110. A Cards Platform may be implemented on any number of servers although only a single server 102 is illustrated for clarity.

In accordance with various embodiments, the server(s) 102 may receive or otherwise obtain a plurality of cards from one or more Card Providers. More particularly, the cards may be generated by the Card Providers, which may be implemented via the server(s) 102 and/or one or more external third-party server(s) 103. A third-party server may be associated with a third-party system (e.g., web site).

In addition, the server(s) 102 may receive contextual information indicating contexts of the client devices 106, 108, 110 via a network 104. For each of the client devices 106, 108, 110, the server(s) 102 may select and rank a set of the cards based, at least in part, on the context of the corresponding one of the client devices 106, 108, 110. In addition, the server(s) 102 may further personalize the set of cards by selecting and/or ranking the set of cards based, at least in part, on characteristics of a user of the corresponding client device. The server(s) 102 may transmit the set of cards or information associated therewith to the corresponding one of the client devices according to the ranking, enabling the cards to be displayed via the client devices 106, 108, 110.

In accordance with various embodiments, a user or client device may subscribe to services offered by various Card Providers. Subscription may be performed automatically by the Cards Platform. For example, a user or client device may be auto-subscribed to popular services. Alternatively, users may browse or search a Service Discovery Store (not shown) that maintains a list of Card Providers or associated services. In some instances, the Cards Platform may recommend Card Providers or associated services. For example, a pop up window suggesting that the user subscribe to a particular service may be presented via a client device. As another example, a recommended Card Provider or service may be presented in a card. Recommended Card Providers or services may be identified based, at least in part, on applications that the user or client device has installed or other services to which the user or client device has subscribed, interaction by the user or client device with cards or applications, and/or other information pertaining to the user or client device.

In one embodiment, the web site implementing the Cards Platform may operate as the Authentication Provider to authenticate users receiving cards from the Cards Platform, while the Card Provider operates as the Relying Party (relying on the Authentication Provider to authenticate users). If a user would like to subscribe to a Card Provider or associated service and the user has an account with the Cards Platform, the user may log in to their account to subscribe to the Card Provider or associated service. For example, the user may submit a request to subscribe to the Card Provider (e.g., by clicking to add the Card Provider or Service). An account may then be established with the Card Provider, establishing the user as a member of the service or Card Provider. The user's information (e.g., retained in a user profile or account information) may be used by the Card Provider to personalize cards that will be provided to the user or associated client device.

Embodiments disclosed herein may be implemented via the server(s) 102 and/or the client 106, 108, 110. For example, various features may be implemented via an application such as a homescreen application or streaming application installed on the clients 106, 108, 110. The display of cards may be facilitated by communications transmitted between the server(s) 102 and an application on the client devices 106, 108, 110 via a network 104. The client devices 106, 108, 110 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform. An example client device will be described in further detail below with reference to FIG. 4.

The network 104 may take any suitable form, such as a wide area network or Internet and/or one or more local area networks (LAN's). The network 104 may include any suitable number and type of devices, e.g., routers and switches, for forwarding data, search or web object requests from each client to a search or web application of the server(s) 102 and forwarding search or web results (e.g., cards) back to the requesting clients.

The disclosed embodiments may be practiced in a wide variety of network environments (represented by network 104) including, for example, TCP/IP-based networks, telecommunications networks, wireless networks, etc. In addition, computer program instructions with which embodiments of the invention may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

In accordance with various embodiments, the server(s) 102 may transmit a list of cards to an application such as a streaming application of one of the clients 106, 108, 110 via the network 104. The list may also include or be linked to information that enables the corresponding cards to be displayed. In some embodiments, the server(s) 102 may transmit one or more cards (rather than a list of cards), which may be displayed by the corresponding client.

Each of the client devices 106, 108, 110 (e.g., streaming application) may act as arbiter to decide which of the cards, if any, to display. In some instances, a client device may decide to display a card that it has identified or generated independently from the server(s) 102.

When a card is created, the card may include content such as text and/or image(s). In addition, the card may include one or more modules configured to retrieve and/or display content. For example, the modules may be configured to display content according to a particular format.

A card may also have associated metadata. For example, the metadata may be maintained in fields of an instantiated user interface object. The metadata may indicate a context in which the card, module(s), and/or associated content is relevant. More particularly, the context may indicate a time, geographic region, and/or venue for which the content of a card or module will be relevant. In addition, the context may indicate how long the card will be valid (e.g., a deadline by which the content will no longer be relevant) or when the card is to be refreshed. For example, the metadata may indicate that a card is to be refreshed after a particular amount of time or when there is a change in context.

In accordance with various embodiments, the metadata of a card may indicate whether a user interacted with the card, the percentage of all users that have interacted with the card, the percentage of a particular group of users that have interacted with the card, a priority or importance of the card, a priority or importance of modules within the card, and/or any contextual information that enables a previous state to be resumed. For example, where the card reminds the user to send an anniversary card, the metadata may indicate that the card is of high priority and that the card will expire the date after the anniversary.

Cards may be selected and/or ranked for a client device based, at least in part, on information retained in a user profile. More particularly, the server 102 (or servers) may maintain a plurality of user profiles of users in the data stores 118. Each profile may be associated with a corresponding user represented by a user account identifier, browser identifier, and/or client device identifier.

A user profile may be associated with one or more client devices. Conversely, each client device may be associated with a set of one or more users, enabling user profile(s) associated with the client device to be identified.

In accordance with various embodiments, the data stores 118 may include one or more databases such as user databases into which user information is retained for each of a plurality of users. This user information or a portion thereof may be referred to as a user profile. More particularly, the user profile may include public information that is available in a public profile and/or private information.

The user information retained in a user profile may indicate a plurality of features for a corresponding user. More particularly, the features may include personal information such as demographic information (e.g., age, marital status, and/or gender) and/or geographic information (e.g., residence address and/or work address). In addition, the features may indicate types of content consumed by the user and/or interests of the user.

In addition, the user information may include or be derived from content of electronic communications such as electronic mail messages transmitted by the user or received by the user. The user information may also include content of electronic documents generated or received by the user. The user information may also include or be linked to contacts of the user and/or a calendar of the user.

Contextual information indicating a current or recent context of a client device may be maintained in the corresponding user profile or a device profile. More particularly, the contextual information may include, but is not limited to, a date, a time, a time of day (e.g., morning, evening, etc.), a day of week, a location of the user or client device, a status of a battery of the client device, a status of a screen of the client device, a Bluetooth status, a status of a wireless network connection at the client device, nearby wifi addresses, a headphone status, a status of a charge cable, a status of an audio cable, a brightness detected at the client device, a volume detected at the client device, sounds or words detected at the client device, temperature, user fitness information, traveling speed, pressure, phone usage data, electronic mail messages that have been received by the user or the client device, electronic mail messages that have been transmitted by the user or client device, notifications that have been received at the client device via a short message service (SMS), notifications or messages that have been received by a user of the client device via a social network, applications installed on the client device, and/or currently active application.

The contextual information may also include or be derived from historical information received from the client device(s) of a user. More particularly, the historical information may indicate a history of interactions of a user with the client device. As will be described in further detail below, the historical information may indicate a history of user engagement with respect to cards presented via the client device(s), a history of user engagement with applications installed on the client device(s), and/or a history of user engagement with notifications provided via the client device(s).

The current location of a user or client device may be identified based upon signals explicitly transmitted by the user or implicit signals. Examples of implicit signals include an Internet Protocol (IP) address or Global Positioning System (GPS) location of a client device, which may be used to infer a location of the client device or user. As another example, the location of the client device may be implied through cell tower triangulation. In addition, a user may explicitly check in to a location via the use of a check in application, which may be accessed via a website and/or installed on a client device such as a mobile device.

In addition, each time a user performs online activities such as clicking on a web page (or region thereof) or an advertisement, or purchasing goods or services, information regarding such activity or activities may be retained as user data in the user profile. For example, the user profile may indicate the identity of web sites visited, identity of ads that have been selected (e.g., clicked on), and/or a timestamp. In addition, the features may indicate a purchase history with respect to one or more products, one or more types of products, one or more services, and/or one or more types of services.

The user logs may further include query logs into which search information is retained. Each time a user performs a search on one or more search terms, information regarding such search may be retained in the query logs. For instance, the user's search request may contain any number of parameters, such as user or browser identity and the search terms, which may be retained in the query logs. Additional information related to the search, such as a timestamp, may also be retained in the query logs along with the search request parameters. When results are presented to the user based on the entered search terms, parameters from such search results may also be retained in the query logs. For example, an identity of the specific search results (e.g., URLs), such as the web sites, the order in which the search results are presented, whether each search result is a sponsored or algorithmic search result, the owner (e.g., web site) of each search result, and/or whether each search result is selected (i.e., clicked on) by the user (if any), may be retained in the query logs.

A variety of mechanisms may be implemented to support the generation or updating of user profiles including, but not limited to, collecting or mining navigation history, stored documents, tags, messages, or annotations, to provide a few examples. Profiles of users of a search engine, for example, may give a search engine provider a mechanism to retrieve annotations, tags, stored pages, navigation history, or the like, which may be useful for making relevance determinations of search results, such as with respect to a particular user.

Figure 2A:
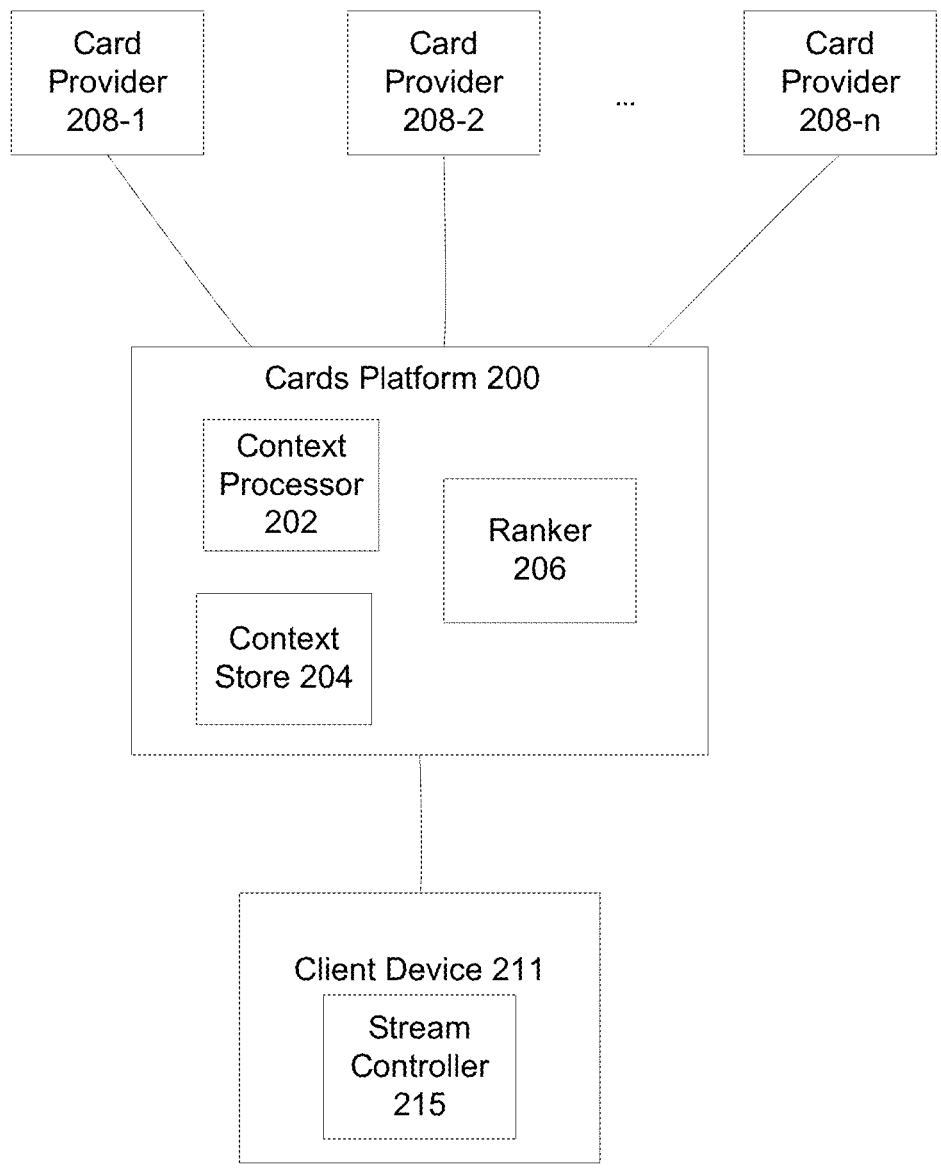
FIG. 2A is a block diagram illustrating an example decentralized cards platform that may be implemented in accordance with various embodiments.

FIG. 2A is a block diagram illustrating an example decentralized Cards Platform 200 that may be implemented in accordance with various embodiments. As shown in this example, the Cards Platform 200 may include a Context Processor 202 that processes contextual information received from or otherwise associated with client devices 211. For example, the contextual information received from the client devices 211 may indicate contexts of the client devices 211 or updates to the contexts of the client devices 211. In addition, the Context Processor 202 may receive or obtain contextual information associated with the client devices 211 or associated users from other sources such as electronic mail (email) accounts (e.g., emails transmitted or received), microblogging accounts (e.g., tweets), or document sharing tools such as Google Drive or Dropbox. The Context Processor 202 may store contextual data including and/or derived from the contextual information, historical information, and/or other profile characteristics in corresponding user or device profiles, which may be stored in Context Store 204. The Context Processor 202 may also store historical information pertaining to the context and/or behavior of individuals. The Context Store 204 may include one or more memories in which one or more databases are maintained.

In some embodiments, the Context Processor 202 may process the contextual data such as the contextual information that it has received to enrich the contextual data that is stored in the corresponding profiles or other information maintained in the Context Store 204. For example, the Context Processor 202 may perform a venue lookup for a location, which may include a latitude and longitude or other location information.

The Context Processor 202 may also operate as a behavioral profiler. For example, the Context Processor 202 may analyze user or device profiles to generate interests for a user or corresponding device. The Context Processor 202 may store information in a corresponding user profile that indicates the interests of the user. In addition, the Context Processor 202 may identify Card Providers or associated services that may interest the user.

In accordance with various embodiments, a server may provide information pertaining to users and/or client devices to one or more Card Providers 208-1, 208-2 . . . 208-n. More particularly, the Context Processor 202 may transmit information including contextual data and/or other data obtained or derived from a user profile to the Card Providers 208-1, 208-2 . . . 208-n. Such transmissions may be performed in the form of bulk transmissions, periodic updates, or real-time streaming. For example, the Card Providers 208-1, 208-2 . . . 208-n may subscribe to receive a user's real time location updates. Alternatively, the Card Providers 208-1, 208-2 . . . 208-n may access contextual data and/or other data such as that described herein via an API. The Context Processor 202 may transmit information to the Card Providers 208-1, 208-2 . . . 208-n according to permissions that have been established by the user (e.g., in association with a particular user and/or device). The establishment of permissions will be described in further detail below. As described above, the Card Providers 208-1, 208-2 . . . 208-n may be implemented internally (e.g., $1^{st}$ party) by server(s) of a web site and/or externally (e.g., via $3^{rd}$ party web sites).

Similarly, an Analytics Service (not shown) may maintain and analyze historical information pertaining to client engagement with cards, applications, and/or notifications. The Analytics Service may transmit historical information or a portion thereof to the Card Providers 208-1, 208-2 . . . 208-n or, alternatively, may provide access to the historical information to the Card Providers 208-1, 208-2 . . . 208-n via an API. Access to historical information may be provided according to permissions that have been established (e.g., in association with a particular user and/or device).

Client devices may establish privacy preferences (i.e. permissions) that indicate which subset of the contextual data (e.g., location), historical information, and/or other profile characteristics may be shared with the Card Providers 208-1, 208-2 . . . 208-n. Moreover, the client devices may indicate a particular subset of the Card Providers 208-1, 208-2 . . . 208-n (e.g., specific web sites or category of business) that may receive contextual data, historical information, and/or profile characteristics. For example, a client device may indicate a particular subset of the Card Providers 208-1, 208-2 . . . 208-n to which corresponding permissions pertain. In addition, the client devices may indicate the situations (e.g., contexts) in which the subset of the contextual data and/or profile characteristics may be shared with the Card Providers 208-1, 208-2 . . . 208-n. For example, such situations may include presence in a particular business, category of business, particular venue, or category of venues.

A Ranker 206 may receive, obtain, or retrieve cards provided by one or more of the Card Providers 208-1, 208-2 . . . 208-n (e.g., via a card cache). The Ranker 206 may select and rank a set of the cards that are pertinent to client device(s) based, at least in part, on a set of characteristics associated with the client device(s) or associated user(s). The set of characteristics may include contextual data and/or other profile characteristics. In addition, the set of characteristics may include historical information pertaining to a client's engagement (or lack thereof) with previously presented cards, applications, and/or notifications. Engagement may include any interaction with the card by a user via a touch-screen display of the client device (e.g., by tapping an icon representing the card), gesture, voice command, keyboard, or other input device. For example, engagement may indicate that the user wishes to view content of the card, that the user likes the content of the card, that the user would like to wait until a later time to view or otherwise interact with content of the card, or that the user is dismissing the card (so that the card will be removed from the display of the client device). Thus, engagement with a card may be positive or negative. Examples of historical information that may be transmitted by the client will be described in further detail below.

In some embodiments, the Ranker 206 may select and rank a set of the cards based, at least in part, on the historical information associated with a single client device. In other embodiments, the Ranker 206 may select and rank the set of cards based, at least in part, on the historical information associated with all client devices or multiple client devices (or users) that share some characteristics.

The Ranker 206 may also select and rank a set of cards based, at least in part, on metadata associated with the cards. More particularly, the Ranker 206 may consider ranking guidance (e.g., triggering guidance) provided by a Card Provider that indicates context(s) in which a card or module is relevant. For example, a card or module pertaining to a flight may be pertinent when the client device is within 1 mile from the departure airport. In addition, the triggering guidance may indicate an assertion by the Card Provider about the relative importance (e.g., priority) of the card in relation to other cards served by the Card Provider, the importance of modules of the card, the importance of the card to a particular client device, and/or the importance of modules within the card to a particular client device. Similarly, the triggering guidance may indicate an importance of the card/module to a particular client device or to client devices under the relevant context(s). Therefore, the Ranker 206 may select and rank cards based, at least in part, on a context of the client device.

The Ranker 206 may also select and rank a set of the cards based, at least in part, on a trustworthiness of the Card Provider(s) from which the cards were obtained. The trustworthiness of a Card Provider may be determined by applying a Trustworthiness Detector Model that analyzes information indicative of the trustworthiness of the Card Provider. Information indicative of the trustworthiness of a Card Provider may include, but is not limited to: 1) triggering guidance (e.g., a priority and/or importance) assigned by the Card Provider to the specific card, modules within the card, other card(s) of the Card Provider, and/or other modules provided by the Card Provider; and/or 2) historical information pertaining to user engagement with card(s) from the Card Provider over a period of time. In other words, the Ranker 206 may determine the trustworthiness of a Card Provider by determining the accuracy of the triggering guidance provided by the Card Provider over a period of time based, at least in part, on the historical information pertaining to user engagement. If the trustworthiness of a Card Provider indicates that the Card Provider has a history of inflating the priority/importance of their cards or modules, the ranking of cards of the Card Provider may be decreased.

In accordance with various embodiments, the Ranker 206 may bundle cards together. For example, it may be desirable to bundle cards that are similar, solve a similar intent, or come from the same Card Provider. The cards in the bundle may be displayed adjacent to one another within a stream, may be displayed in a configuration that is opposite to the configuration of the stream (e.g., displayed horizontally in a vertical stream), may be displayed such that they visually overlap one another, or may be displayed in a substream.

A ranked set of cards or associated information that is pertinent to a user, client device, and/or associated context may be transmitted to a client device 211 over the network 104 for display. For example, a list of cards indicating an associated ranking may be transmitted to the client device 211. In some instances, a card or associated information that is transmitted to the client device 211 may include content or a URL that enables content to be retrieved by the client device 211. In addition, the card or associated information may indicate a context (e.g., location, date, and/or time) in which the content is to be retrieved and presented by the client device 211.

In some instances, the ranked set of cards or associated information may be transmitted in response to a search query received from the client device 211. In some embodiments, contextual information indicating a current context of the client device 211 may be received with the search query.

A Query Parser (not shown) may select the set of cards from a plurality of cards based, at least in part, on the search query and the current context of the client device 211. The Query Parser may run the query on a card cache maintained on the Cards Platform 200 (e.g., server) and/or various databases. The Query Parser may submit the query (and any relevant contextual information) to a general web search engine. In addition, the Query Parser may determine which Card Provider(s) 208-1, 208-2, 208-n are relevant to the query that has been received, and transmit the query (and any relevant contextual information) to the relevant Card Provider(s). For example, the query may be submitted by the Query Parser via an Application Programming Interface (API) of the Card Provider(s) 208-1, 208-2, 208-n. The Card Provider(s) 208-1, 208-2, 208-n may further communicate with or query Domain Specific Information Providers (DSIPs). In some embodiments, the Query Parser may send a query directly to a DSIP.

In accordance with various embodiments, the Card Providers 208-1, 208-2, 208-n may register with the Query Parser. For example, each of the Card Providers 208-1, 208-2, 208-n may provide a URL to which search queries may be sent to the corresponding Card Provider. The Card Providers 208-1, 208-2, 208-n may also provide information indicating which types of queries they can answer. For example, a Card Provider may indicate the types of content that they can access to answer a search query by providing a list of keywords. The Card Provider may also provide scores associated with the list of keywords indicating the likelihood that the Card Provider will be able to provide an answer to a search query pertaining to a keyword or set of keywords.

A Card Provider may provide cards to the Ranker in response to a search query. More particularly, a Card Provider may identify a card that is relevant to the search query. Alternatively, the Card Provider may identify content that is relevant to the search query and generate a card from the content. For example, a Card Provider may generate a card from content it has obtained via a DSIP.

The Ranker 206 may select and rank cards identified as a result of processing a search query. In some embodiments, the Card Providers 208-1, 208-2, 208-n may provide post-retrieval scores that indicate the Card Providers' confidence that the search result(s) provided by the Card Provider will be valuable to the user that submitted the search query. For example, the importance of a card may include or indicate a post-retrieval score associated with the card. Therefore, the Ranker 206 may select and/or rank cards based, at least in part, on the associated post-retrieval scores, trustworthiness of the Card Providers 208-1, 208-2, 208-n, the search query, and/or other factors.

The ranked set of cards or associated information may be transmitted to the client device 211 automatically. Alternatively, the ranked set of cards or associated information may be transmitted to the client device 211 in response to a card or search request. For example, the ranked set of cards or associated information may be transmitted to a stream controller 215 of the client device 211, as will be described in further detail below.

Figure 2B:
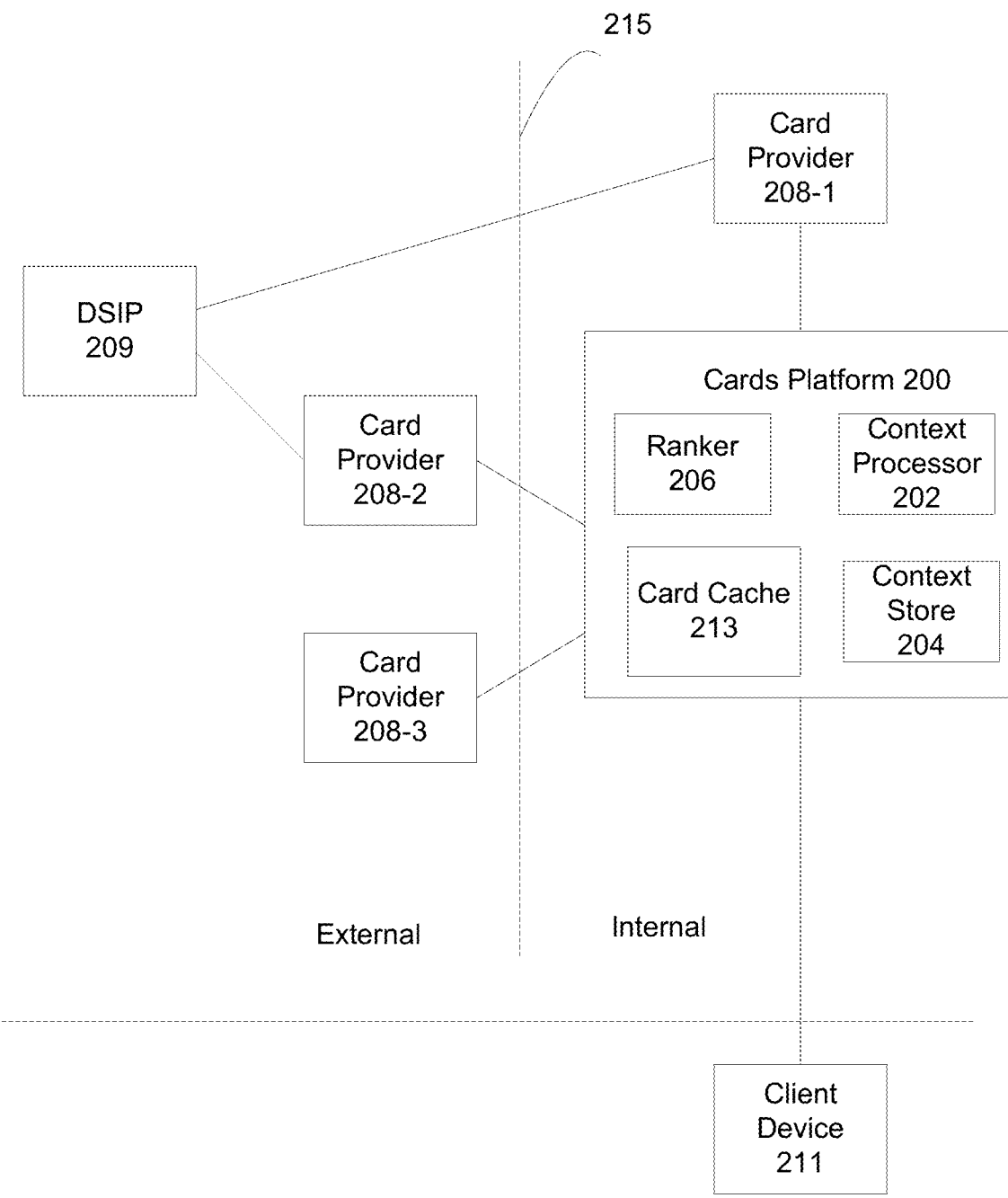
FIG. 2B is a block diagram illustrating an example network environment in which a cards platform may be implemented in accordance with various embodiments.

FIG. 2B is a block diagram illustrating an example network environment in which a cards platform may be implemented in accordance with various embodiments. Each of the Card Providers 208-1, 208-2, 208-3 may generate cards using information received or obtained from one or more DSIPs 209. More particularly, a Card Provider may maintain its own DSIP (not shown). Alternatively, a Card Provider may obtain information from a DSIP external to the Card Provider (e.g., via an Application Programming Interface (API) or transmissions performed via the DSIP).

In this example, line 215 separates system elements that are internal to a network (e.g., associated with a web site) from elements that are external to the network. More particularly, Card Provider 208-1 is internal to the network, while Card Providers 208-2 and 208-3 are external to the network. While a single DSIP 209 is shown to be external to the network to simplify the illustration, additional DSIPs may also be implemented external to the network, as well as internal to the network. Each DSIP may maintain or have access to knowledge about specific domains (e.g., local, travel, recipes).

As shown in FIG. 2B, both Card Provider 208-1 (internal to the network) and Card Provider 208-2 (external to the network) communicate with the DSIP 209, while Card Provider 208-3 maintains its own DSIP. Each of the Card Providers 208-1, 208-2, 208-3 may generate a card using information received or obtained from DSIPs, or may further process the information prior to card generation.

A Card Generator (not shown) may enable a Card Provider to generate cards from content. The Card Generator may enable cards to be generated in an automated manner. Alternatively, the Card Generator may provide a graphical user interface that enables users to design or select modules that may be used to present associated content.

A card may include content and/or computer-readable code for retrieving content. For example, content may be fetched from a URL by the Cards Platform 200 or a client device. As another example, data may be submitted to a URL by the Cards Platform 200 or a client device. In addition, a card may include computer-readable code for formatting and/or displaying content.

In accordance with various embodiments, a card may include one or more modules. For example, a module may include computer-readable code for retrieving, formatting, and/or displaying content. More particularly, a module may be an instantiation of a module type selected from a library of module types. Example module types include, but are not limited to, a title, heading image, table of data, controls (e.g., drawers, check boxes, buttons such as radio buttons, drop down select), filters, search boxes, and/or search refinements. Therefore, a card may include a composite of user interface elements.

In addition, a card may include a hypertext link. The hypertext link may access a website or application. Where an application is not installed on the client device, the link may access an application store so that the user may purchase or download the application.

A Card Provider may rank cards in relation to one another, and assign a relative importance or priority to the cards according to the ranking. In addition, a Card Provider may rank modules to assign a priority/importance to the modules.

The rankings of cards and/or modules may be maintained internally by a Card Provider and/or may be communicated to external entities by maintaining the priority/importance of the cards and/or modules within the metadata of the cards. For example, the priority/importance may indicate the importance of a card/module to a particular client device or to client devices under a corresponding set of context(s) indicated within the metadata.

Each of the Card Providers 208-1, 208-2 . . . 208-n may provide cards via a variety of mechanisms. First, a Card Provider may provide a complete card. Second, a Card Provider may provide a URL via which a card may be accessed. Third, a Card Provider may provide a template via which a card may be displayed, enabling content to be later provided by the Card Provider for display via the template. For example, a Card Provider may register computer-readable code composed of multiple modules as a template with the Cards Platform (e.g., web site). The Card Provider may subsequently provide content that may be displayed using the template. For example, the Card Provider may identify the template that is to be used to display the data.

The Card Providers 208-1, 208-2 . . . 208-n may provide cards by submitting cards for storage to a data store, which may include one or more memories. In accordance with various embodiments, the Card Providers 208-1, 208-2 . . . 208-n may submit cards to a card cache 213 of the Cards Platform 200. The card cache 213 may fetch cards via the associated URLs. In some instances, a card cache 213 may be specific to a particular user or client device. Therefore, the Cards Platform 200 may include multiple card caches 213.

The Card Providers may also provide updated cards. More particularly, a Card Provider may resubmit a card to the card cache 213. For example, a Card Provider may resubmit a card if there is an update to data obtained, received, or processed via the Card Provider. As another example, a Card Provider may resubmit a card if there is an update to the context or other information pertaining to a user or client device.

Figure 2C:
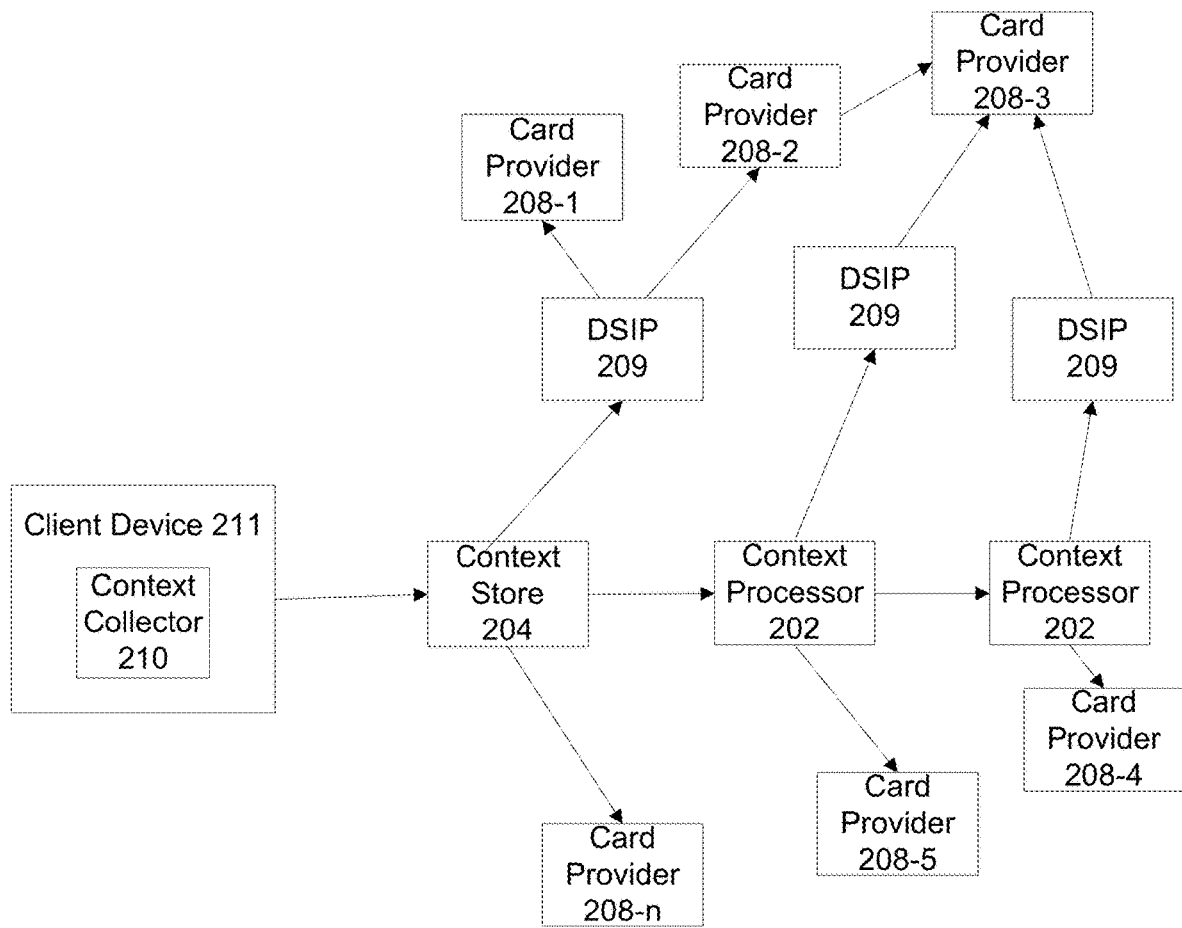
FIG. 2C is a block diagram illustrating the propagation of contextual information in accordance with various embodiments.

FIG. 2C is a block diagram illustrating the propagation of contextual information in accordance with various embodiments. Contextual information pertaining to the context of a client device 211 may be obtained from a context collector 210 of the client device. The context may pertain to information that is continuously sensed or gathered by the client device, data or messages that are received via the client device, and/or applications that are installed on the mobile device.

Contextual data associated with a plurality of client devices may be maintained in the Context Store 204. More particularly, the contextual data may include the contextual information or a portion thereof. In addition, the contextual data may be derived from the contextual information associated with one or more client devices. Therefore, the Context Store 204 may maintain contextual data associated with individual client devices, as well as groups of client devices.

Contextual data, historical information, user characteristics, and/or other information retrieved from the Context Store 204 or other data stores may be processed by one or more Context Processors 202. Moreover, two or more Context Processors 202 may operate consecutively such that the output of one of the Context Processors 202 is processed by another one of the Context Processors 202. For example, a first Context Processor 202 may obtain information from the Context Store 204 and process the information to produce output that is processed by a second Context Processor 202. Each Context Processor 202 may be configured or designed for various purposes.

In some embodiments, the DSIPs 209 may communicate with one another via APIs. Thus, a DSIP 209 may obtain domain-specific information from one or more other DSIPs 209 to generate its own domain-specific information. For example, a first DSIP may process electronic mail messages to extract travel booking information, while a second DSIP may process the travel booking information and suggest additional items to see or do such as rental cars, attractions, or restaurants.

The Card Providers 208-1, 208-2 . . . 208-n may generate cards using information retrieved from the Context Store 204 and/or Context Processor(s) 202. In addition, the Card Provider(s) 208-1, 208-2 . . . 208-n may communicate with or query DSIPs 209 and/or other Card Providers 208-1, 208-2 . . . n. In some embodiments, a DSIP 209 may retrieve, receive, or otherwise obtain information from the Context Store 204 and/or Context Processor(s) 202.

Figure 2D:
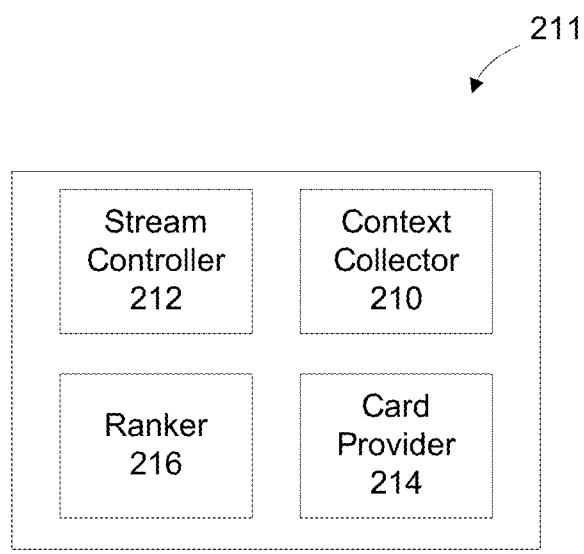
FIG. 2D is a block diagram illustrating example functionality of a client device with which the cards platform may communicate.

FIG. 2D is a block diagram illustrating example functionality of a client device with which the cards platform may communicate. A Context Collector 210 may collect contextual information of the client device 211. The contextual information may include or be derived from information that is continuously sensed or gathered by the client device, data or messages that are received via the client device, and/or applications that are installed on the mobile device. As described herein, the contextual information may indicate a current context of the client device, historical information (e.g., client engagement), device characteristics, and/or other information. Examples of contextual information that may be sent includes, but is not limited to, a date, a time, a time of day (e.g., morning, evening, etc.), a day of week, a location of the user or client device, a status of a battery of the client device, a status of a screen of the client device, a Bluetooth status, a status of a wireless network connection at the client device, nearby wifi addresses, a headphone status, a status of a charge cable, a status of an audio cable, a brightness detected at the client device, a volume detected at the client device, sounds or words detected at the client device, a temperature, user fitness information, traveling speed, pressure, phone usage data, electronic mail messages that have been received by the user or the client device, electronic mail messages that have been transmitted by the user or client device, notifications that have been received at the client device via a short message service (SMS), notifications or messages that have been received by a user of the client device via a social network, applications installed on the client device, and/or currently active application. Therefore, contextual information may include historical information and/or user characteristics.

The contextual information or a portion thereof may be processed internally by the client device 211. In addition, the contextual information may be transmitted to the Cards Platform or other entities (e.g., Card Providers or DSIPs), either automatically or in response to a request.

In some embodiments, the client device may include a Card Provider 214, which may generate one or more cards based, at least in part, on the contextual information. A Stream Controller 212 may provide a stream of cards for presentation via a display of the client device 211. More particularly, the cards that are presented by the Stream Controller 212 may include those that are received from the Cards Platform, received from Card Providers external to the Cards Platform, and/or generated internally by the Card Provider 214 of the client device 211. The Stream Controller 212 may present the cards according to a ranking determined by a Ranker 214 of the client device 211.

Figure 2E:
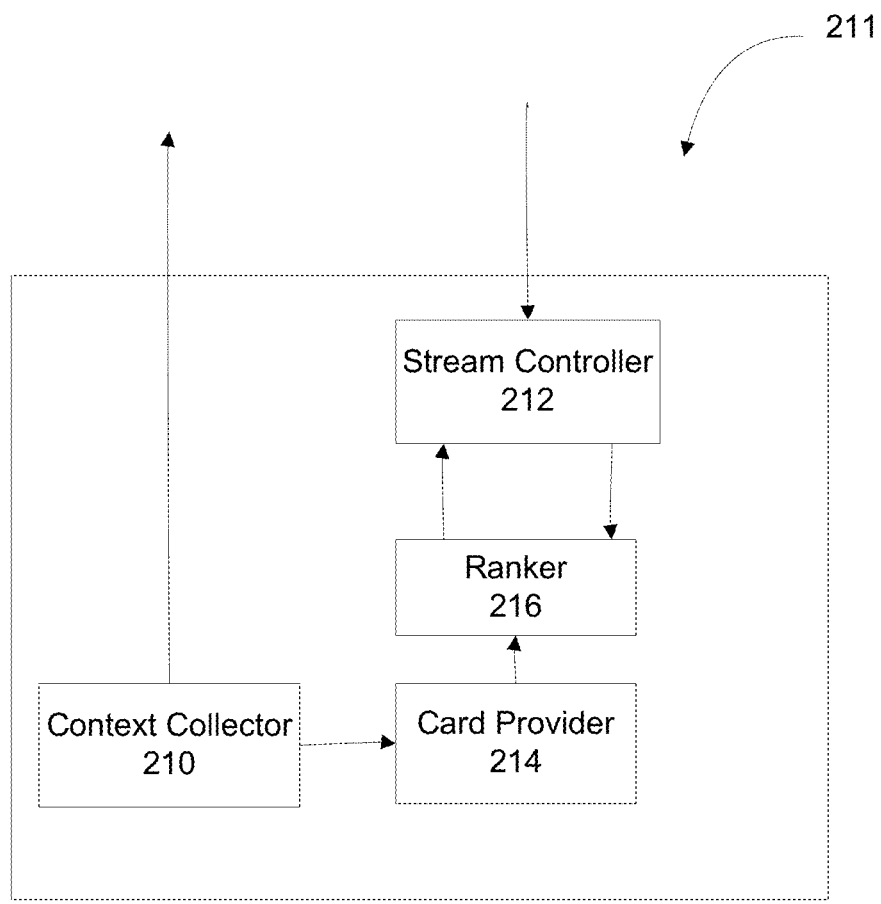
FIG. 2E is a block diagram illustrating an example client device in accordance with one embodiment.

FIG. 2E is a block diagram illustrating an example client device in accordance with one embodiment. As shown in this example, the Context Collector 210 may transmit contextual information to the Cards Platform 200. For example, the Context Collector 210 may transmit the contextual information to the Ranker 206. The contextual information that is sent may include all current contextual information or updates to previously sent contextual information. The contextual information may be sent automatically (e.g., periodically) or in response to a request from the Cards Platform 200. In some embodiments, the Context Collector 210 may transmit the contextual information or a portion thereof to specific Card Providers, either automatically or in response to requests from the Card Providers.

In addition, the Context Collector 210 may provide contextual information to the internal Card Provider 214. The Card Provider 214 may generate cards based, at least in part, on the contextual information and provide the generated cards to the Ranker 216. The Card Provider 214 may also generate cards based on information obtained from DSIP(s)). For example, cards may be generated via a Card Generator.

The Stream Controller 212 may receive cards from the Cards Platform 200 (e.g., server or Ranker 206). More particularly, the Stream Controller 212 may request cards from the Cards Platform 200. A request for cards may be transmitted periodically or in response to a change in context of the client device. For example, the client device may send a request including contextual information to the Cards Platform 200. Alternatively, the Stream Controller 212 may receive cards from the Cards Platform 200 automatically. For example, cards may be received based upon a subscription by the user or client device to specific Card Providers or services.

In accordance with various embodiments, the Stream Controller 212 may invoke the Ranker 216 that selects those cards that are to be displayed via the client device. More particularly, the Ranker 216 may choose which cards it has received from the Cards Platform 200 to display via the client device. For example, the Ranker 216 may choose to display all of the cards it has received from the Cards Platform 200 or only a subset of the cards it has received from the Cards Platform 200. In addition, the Ranker 216 may choose to display cards generated by the Card Provider 214 of the client device 211.

The Ranker 216 may also determine the order in which the cards are to be displayed via the client device 211. For example, the Ranker 216 may rank a plurality of cards and select the top N ranked cards to display via the client device. In this manner, the Ranker 216 may rank the cards that are to be displayed via the client device.

The Ranker 216 may rank the cards, which may include cards received from the Cards Platform 200 and/or cards generated by its own Card Provider 214 according to various criteria. The criteria may include externally derived criteria such as ranking guidances provided by Card Providers, which may indicate an importance and/or priority that have been assigned to specific cards or modules by the Card Providers. For example, the ranking guidance may indicate an importance of a card/module to a particular client device or to client devices under the relevant context(s). The criteria may also include the current context of the client device and/or internally derived criteria such as historical information maintained by the client device.

The Stream Controller 212 may display the cards that it has received from the Cards Platform 200 (e.g., server or Ranker 206) or a portion thereof via a display of the client device. In addition, the Stream Controller 212 may display cards that it has generated via its own Card Provider 214. In some embodiments, the Stream Controller 212 may present a stream of cards via a display of the mobile device along a vertical or horizontal axis.

The client device 211 may detect engagement with cards that are presented by the Stream Controller 212 via a display of the mobile device. In addition, the client device 211 may detect engagement with applications installed on the client device 211, notifications received via the client device 211, or other messages received via the client device 211.

The client device 211 (e.g., Stream Controller 212 or Context Collector 210) may maintain historical information to engagement with the cards that have been displayed via a display of the client device, engagement with applications installed on the client device, and/or engagement with notifications that have been transmitted to the device. For example, the historical information may include analytics indicating information such as the order in which the cards have been accessed via the client device (e.g., viewed by a user), the identity of cards that have not been accessed (e.g., viewed by the user) within a period of time, a number of times or frequency with which specific cards have been accessed, a time or recency with which specific cards have been accessed, types of cards that are accessed most or least frequently, categories of content that are accessed most or least frequently, the amount of engagement with specific card, and/or the type of engagement with specific card (e.g., tap, wait, dismiss). The client device (e.g., Stream Controller 212 or Context Collector 210) may transmit the historical information or a portion thereof to the Cards Platform 200 (e.g., server or Ranker 206).

Figure 3:
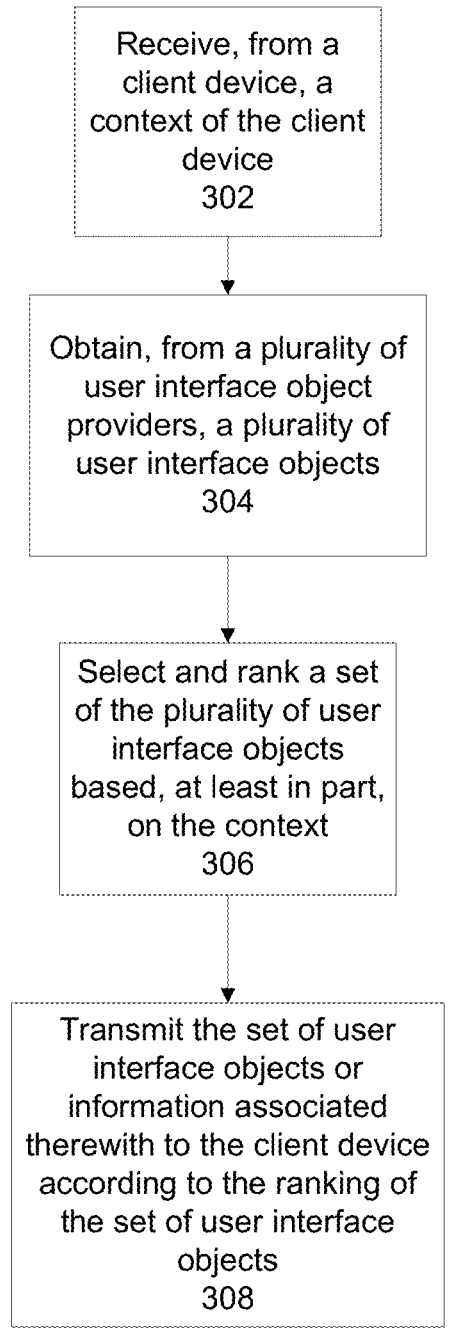
FIG. 3 is a process flow diagram illustrating an example method of implementing a decentralized cards platform in accordance with various embodiments.

FIG. 3 is a process flow diagram illustrating an example method of implementing a decentralized cards platform in accordance with various embodiments. One or more servers may receive, from a client device, a context of the client device at 302. In addition, the servers may receive from the client device historical information pertaining to engagement with cards, engagement with applications, and/or engagement with notifications. As described herein, the servers may also access a user profile associated with the client device.

In some instances, the servers may provide at least a portion of the context, historical information, and/or user profile characteristics to Card Providers. For example, the Card Providers may register to receive information pertaining to specific client devices. As described above, the context, historical information, and/or user profile characteristics may be provided according to user permissions.

The servers may obtain, from a plurality of Card Providers, a plurality of cards at 304. A Card Provider may implemented by the server(s) of a web site and/or by an external server that is external to the web site. For example, the servers may receive cards from an external server via the Internet.

The servers may receive a complete card from a Card Provider. Alternatively, the servers may receive a template prior to receiving content from a Card Provider. The servers may then generate a card from the template and content (e.g., via a Card Generator). In other instances, the servers may receive a URL from a Card Provider, and subsequently retrieve a card via the URL.

The servers may also receive metadata associated with a card from a Card Provider. For example, the metadata may indicate context(s) that are relevant to the card or module(s) within the card. As another example, the metadata may include a ranking guidance. The ranking guidance may indicate a priority of the card relative to other cards provided by the Card Provider and/or a priority of specific modules within the card. Similarly, the ranking guidance may indicate an importance of the card/module to a particular client device or to client devices under the relevant context(s). In some instances, a card may be addressed to a particular client device or set of client devices.

The servers may determine a trustworthiness of a Card Provider. More particularly, the servers may determine an accuracy of the ranking guidance provided by the Card Provider and/or post-retrieval scores provided by the Card Provider. For example, the servers may determine an accuracy of the post-retrieval scores based, at least in part, on historical information pertaining to engagement with cards provided by the Card Provider.

The servers may select and rank a set of the plurality of cards based, at least in part, on the context of the client device at 306. More particularly, the servers may rank the plurality of cards and select a subset of the plurality of cards based, at least in part, on the ranking. Alternatively, the servers may select a subset of the plurality of cards and rank the selected subset of cards.

In addition, the selection and/or ranking may be performed based, at least in part, on additional information pertaining to the client device and/or other client devices. This additional information may include, but is not limited to, historical information, user profile(s), metadata associated with cards, trustworthiness of the Card Providers.

In some instances, the set of cards may be selected and/or ranked based, at least in part on a search query. The server(s) may process a search query using various mechanisms. More particularly, the server(s) may search its card cache of cards received from Card Providers. In some instances, the server(s) may identify Card Providers that are relevant to the search query and transmit the search query to the identified Card Providers. In other instances, the servers may identify content that is relevant to the search query and generate a card including or providing access to the content.

The servers may transmit the set of cards or information associated therewith at 308 to the client device according to a ranking of the set of cards. For example, the servers may transmit the set of cards with an indication of the ranking to the client device. The cards may be transmitted automatically (in the absence of a request from the client device). Alternatively, the cards may be transmitted in response to a request or according to a subscription by the client device to Card Provider(s) or associated services. A request may include a general request for cards or a search query.

In some embodiments, the servers may transmit a list of ranked cards to the client. The client may choose to accept the ranking of the servers or may re-rank the cards. Moreover, the client device may display one or more of the cards or, alternatively, may choose not to display any of the cards identified in the list it has received.

The client may also generate one or more cards via a local Card Provider. The client device may prioritize these additional cards or add these locally generated cards to the list of cards received from the servers prior to performing its own selection and/or ranking process. If the client does decide to display a card, the client may retrieve or generate (e.g., instantiate) the card as appropriate and display the card.

The client device may determine the appropriate context (e.g., time and/or location) for display of the cards based, at least in part, on the associated metadata. As described herein, the metadata of a card may indicate ranking guidance and/or relevant context(s). More particularly, the client device may display a card or module immediately or may choose to delay displaying a card or module until a suitable time (e.g., at which the card or module is relevant to the context of the client device). For example, where a travel card includes a flight module and a hotel module, the client device may display the flight module when the client device is at the airport and display the hotel module when the client device is at the hotel.

In accordance with various embodiments, cards may be provided for display at a client device via a stream of cards. More particularly, newly displayed card(s) may be positioned at the beginning (e.g., top) of a stream of cards displayed at a client device. A user may navigate the stream of cards by scrolling within the stream of the cards. For example, a user may scroll along a horizontal or vertical stream of cards.

In some instances, a user may enter a substream, which contains a separate ranking of one or more cards. In addition, a user may navigate back to a previous substream or the main stream. Substreams may be grouped by theme (e.g., entertainment, local, etc.). A stream may be filtered into substreams in response to user input. A stream or substream may be pre-cached, or may be loaded on demand via a URL.

In some embodiments, a card may be displayed in a segment of a display of the client device. More particularly, a card may be displayed in an empty section of a display of a client device or may replace another card within the display. For example, a card may be positioned within a homescreen of the client device.

A card may include a rectangular area (similar to a playing card) that includes text and/or image(s). In some instances, a card may represent an application. In other instances, a card may include a URL or a hypertext link. For example, the card may include a URL or hypertext link that enables the user to make a dinner reservation via OpenTable.

A user may interact with a card displayed via their client device, for example, by clicking (or tapping) on the card. For example, a user may click on the card to launch an application represented by the card. As another example, a user may click or tap on the card to display a larger, "full-size" version of the card. The content of the card may then be displayed in a larger segment of a display of the client device. For example, the card may be displayed as a "panel," which is the full width of a display of a client device.

Payments for products or services identified within cards may be submitted via the Cards Platform or Card Provider. In one embodiment, a button that is displayed within a card may enable a user to submit a transaction to a payment system implemented by the web site or the Card Provider. The payment system may retrieve payment information and shipping information from a user account or prompt a user for entry of this information. Upon completion of the transaction, a notification may be transmitted to the user and/or pertinent Card Provider.

Once a user has interacted with a card (e.g., via payment for a product or service identified within the card), information pertaining to the user interaction with the card may be recorded by the client device as historical information. The client device may transmit the historical information to a server of the Cards Platform 200. The Cards Platform 200 may update its models to enable its Ranker 206 to select and prioritize cards, as described above.

Network Environment

The implementation of a distributed cards platform may be facilitated in any of a wide variety of computing contexts.

For example, implementations are contemplated in which users interact with a diverse network environment via any type of computer (e.g., desktop, laptop, tablet, etc.), media computing platforms (e.g., cable and satellite set top boxes and digital video recorders), handheld computing devices (e.g., PDAs), cell phones, or any other type of computing or communication platform.

Implementations are contemplated in which users interact with a diverse network environment. For example, the network environment may include a variety of networks.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

User interface objects and any corresponding content may be identified, generated, and/or retrieved via a content distribution network. A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

User interface objects may also be identified and presented in a peer-to-peer network. A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling devices via an ad hoc arrangement or configuration. A peer-to-peer network may employ some devices capable of operating as both a "client" and a "server."

In some embodiments, the network environment may include a wireless network that couples client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Communications transmitted via a network typically include signal packets. Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

Signal packets may be communicated between devices of a network, such as, for example, to one or more sites employing a local network address. A signal packet may, for example, be communicated over the Internet from a user site via an access device coupled to the Internet. Likewise, a signal packet may be forwarded via network devices to a target site coupled to the network via a network access device, for example. A signal packet communicated via the Internet may, for example, be routed via a path of gateways, servers, etc. that may route the signal packet in accordance with a target address and availability of a network path to the target address.

Various embodiments may be employed via one or more servers. A computing device that is capable of sending or receiving signals, such as via a wired or wireless network, or capable of processing or storing signals, such as in memory as physical memory states, may operate as a server. Devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

User interface objects or associated content may be identified or provided via a content server. A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOW) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Input that is processed in accordance with the disclosed embodiments may be obtained using a wide variety of techniques. For example, a card request or search request may be submitted via a user's interaction with a local application, web site or web-based application or service and may be accomplished using any of a variety of well-known mechanisms for obtaining information from a user. However, it should be understood that such methods of obtaining input from a user are merely examples and that user input may be obtained in many other ways.

Client Device

Figure 4:
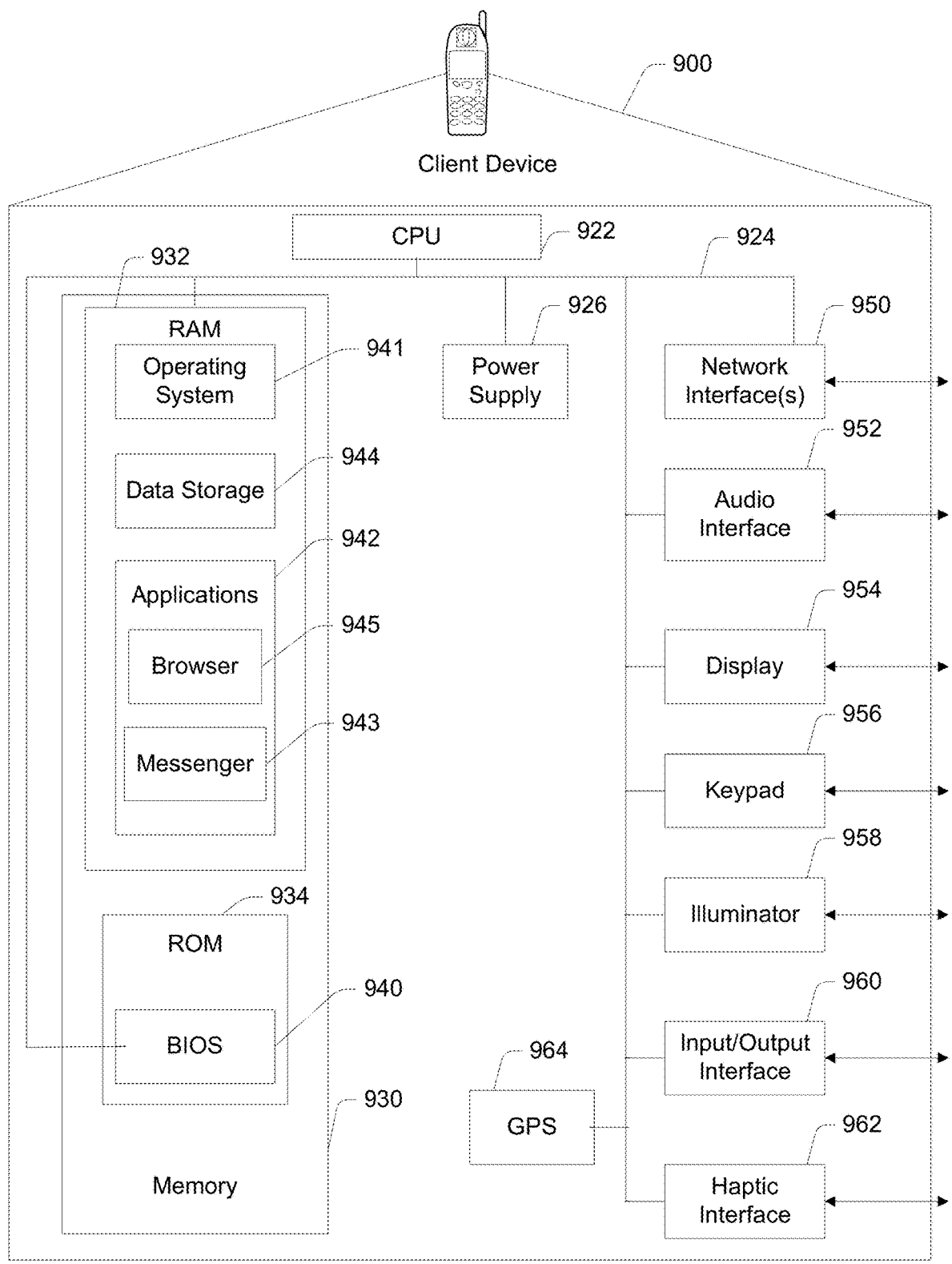
FIG. 4 is a diagram illustrating an example client device in which various embodiments may be implemented.

FIG. 4 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 900 may include one or more central processing units (CPUs) 922, which may be coupled via connection 924 to a power supply 926 and a memory 930. The memory 930 may include random access memory (RAM) 932 and read only memory (ROM) 934. The ROM 934 may include a basic input/output system (BIOS) 940.

The RAM 932 may include an operating system 941. More particularly, a client device may include or may execute a variety of operating systems, including a personal computer operating system, such as a Windows, iOS or Linux, or a mobile operating system, such as iOS, Android, or Windows Mobile, or the like. The client device 900 may also include or may execute a variety of possible applications 942 (shown in RAM 932), such as a client software application such as messenger 943, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 944. A client device may also include or execute an application such as a browser 945 to perform a variety of possible tasks, such as browsing, searching, playing various forms of content, including locally stored or streamed video, or games (such as fantasy sports leagues).

The client device 900 may send or receive signals via one or more interface(s). As shown in this example, the client device 900 may include one or more network interfaces 950. The client device 900 may include an audio interface 952. In addition, the client device 900 may include a display 954 and an illuminator 958. The client device 900 may further include an Input/Output interface 960, as well as a Haptic Interface 962 supporting tactile feedback technology.

The client device 900 may vary in terms of capabilities or features. Claimed subject matter is intended to cover a wide range of potential variations. For example, a cell phone may include a keypad such 956 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 964 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print. From the identity of the user, a user profile and/or client profile may be identified or obtained.

Regardless of the system's configuration, it may employ one or more memories or memory modules configured to store data, program instructions for the general-purpose processing operations and/or the inventive techniques described herein. For example, the program instructions may control the operation of one or more applications. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

The disclosed techniques may be implemented in any suitable combination of software and/or hardware system, such as a web-based server and/or client device. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive and the invention is not to be limited to the details given herein, but may be modified within the scope and equivalents of the appended claims.

What is claimed is:

1. A method, comprising:
   receiving by one or more servers, from a client device, a context of the client device;
   obtaining by the one or more servers, from a plurality of user interface object providers via a network, a plurality of user interface objects comprising at least one of an icon representing an application, an icon representing content, a web page, text, one or more images, a folder comprising content, a folder comprising one or more applications, or a Uniform Resource Locator (URL) via which content is to be retrieved;
   obtaining, from at least one of the plurality of user interface object providers, contextual information, associated with the plurality of user interface objects, indicating one or more contexts in which the plurality of user interface objects are relevant, wherein the contextual information comprises (i) a first context indicative of a time in which a first user interface object of the plurality of user interface objects is relevant and determined based, at least in part, on first metadata maintained in one or more first fields of the first user interface object and (ii) a second context indicative of a venue in which a second user interface object of the plurality of user interface objects is relevant and determined based, at least in part, on second metadata maintained in one or more second fields of the second user interface object,
      wherein the first metadata is indicative of at least one of whether the user interacted with the first user interface object, a percentage of users that have interacted with the first user interface object, a priority of the first user interface object, an importance of the first user interface object, a priority of a first module within the first user interface object, or an importance of the first module within the first user interface object;
   ranking, by the one or more servers, a set of the plurality of user interface objects based, at least in part, on the context of the client device and the contextual information associated with the plurality of user interface objects, wherein the ranking comprises (i) determining a first rank of the first user interface object based, at least in part, on the context of the client device and the first context indicative of the time in which the first user interface object is relevant and (ii) determining a second rank of the second user interface object based, at least in part, on the context of the client device and the second context indicative of the venue in which the second user interface object is relevant; and
   transmitting, by the one or more servers, content associated with the set of the plurality of user interface objects to the client device according to the ranking of the set of the plurality of user interface objects.

2. The method as recited in claim 1, comprising:
   identifying one or more recommended user interface object providers based, at least in part, on at least one of one or more applications installed on the client device, one or more services to which at least one of the user or the client device has subscribed, one or more interactions by at least one of the user or the client device with one or more user interface objects, or one or more interactions by at least one of the user or the client device with one or more applications.

3. The method as recited in claim 2, comprising:
   transmitting content indicative of the one or more recommended user interface object providers to the client device.

4. The method as recited in claim 1, comprising:
   transmitting, by the one or more servers, at least a portion of the context of the client device to at least one of the plurality of user interface object providers;
   wherein at least a portion of the plurality of user interface objects are received from the at least one of the plurality of user interface object providers after the at least a portion of the context is transmitted.

5. The method as recited in claim 1, further comprising:
   receiving, from at least one of the plurality of user interface object providers, ranking guidance in association with at least one of the plurality of user interface objects;
   wherein the ranking the set of the plurality of user interface objects is performed based, at least in part, on the ranking guidance.

6. The method as recited in claim 1, comprising:
   subscribing the client device or a user of the client device to at least one of the plurality of user interface object providers.

7. The method as recited in claim 1, wherein transmitting content associated with the set of the plurality of user interface objects to the client device comprises:
   transmitting the content associated with the set of the plurality of user interface objects to an application installed on the client device.

8. The method as recited in claim 1, comprising:
   determining that the first metadata indicates that the first user interface object is to be refreshed after a first amount of time; and
   determining that the second metadata indicates that the second user interface object is to be refreshed responsive to a change in context.

9. The method as recited in claim 1, wherein the contextual information further comprises a length of time that the first user interface object will be valid.

10. The method as recited in claim 1, wherein the contextual information further comprises a third context indicative of a location in which a third user interface object of the plurality of user interface objects is relevant.

11. The method as recited in claim 1, the first user interface object including a Uniform Resource Locator (URL) via which content associated with the first user interface object can be retrieved.

12. The method as recited in claim 1, at least one of the plurality of user interface objects having second content associated therewith, the contextual information further comprising a geographic region, for which the second content is relevant.

13. The method as recited in claim 1, each of the plurality of user interface objects configured to be rendered on a display.

14. A system comprising:
a first set of one or more servers; and
a second set of one or more servers, wherein the second set of one or more servers implements at least a portion of a plurality of user interface object providers;
wherein the first set of one or more servers is configured to:
obtain, from a client device, a context of the client device;
obtain, via a network from the plurality of user interface object providers, a plurality of user interface objects;
obtain, from at least one of the plurality of user interface object providers, contextual information, associated with the plurality of user interface objects, indicating one or more contexts in which the plurality of user interface objects are relevant,
wherein the contextual information comprises (i) a first context indicative of a time in which a first user interface object of the plurality of user interface objects is relevant and determined based, at least in part, on first metadata maintained in one or more first fields of the first user interface object and (ii) a second context indicative of a venue in which a second user interface object of the plurality of user interface objects is relevant and determined based, at least in part, on second metadata maintained in one or more second fields of the second user interface object,
wherein the first metadata is indicative of at least one of whether the user interacted with the first user interface object, a percentage of users that have interacted with the first user interface object, a priority of the first user interface object, an importance of the first user interface object, a priority of a first module within the first user interface object, or an importance of the first module within the first user interface object;
rank a set of the plurality of user interface objects based, at least in part, on the context of the client device and the contextual information associated with the plurality of user interface objects, wherein the ranking comprises determining a first rank of the first user interface object based, at least in part, on the context of the client device and the first context indicative of the time in which the first user interface object is relevant; and
transmit content associated with the set of the plurality of user interface objects to the client device according to the ranking of the set of the plurality of user interface objects.

15. The system of claim 14, the first set of one or more servers being configured to:
obtain, from at least one of the plurality of user interface object providers, ranking guidance in association with at least one of the plurality of user interface objects;
wherein the ranking the set of the plurality of user interface objects is performed based, at least in part, on the ranking guidance.

16. The system of claim 14, the first set of one or more servers being configured to:
obtain, from at least one of the plurality of user interface object providers, ranking guidance in association with one of the plurality of user interface objects; and
determine an accuracy of the ranking guidance based, at least in part, on historical information pertaining to user engagement with one or more user interface objects provided by the one of the plurality of user interface object providers;
wherein the ranking the set of the plurality of user interface objects is performed based, at least in part, on the ranking guidance and the accuracy of the ranking guidance.

17. The system of claim 14, the first set of one or more servers being configured to:
transmit at least a portion of the context of the client device to at least one of the plurality of user interface object providers;
wherein at least a portion of the plurality of user interface objects are received from the at least one of the plurality of user interface object providers after the at least a portion of the context is transmitted.

18. The system of claim 14, the first set of one or more servers being configured to:
receive a search query;
ascertain that at least one of the plurality of user interface object providers is pertinent to the search query; and
transmit search terms pertaining to the search query to the at least one of the plurality of user interface object providers;
wherein at least one of the plurality of user interface objects is received in response to transmitting the search terms pertaining to the search query to the at least one of the plurality of user interface object providers.

19. The system of claim 14, the first set of one or more servers being configured to:
receive a search query;
identify content that is relevant to the search query; and
convert the content that is relevant to the search query such that at least one of the plurality of user interface objects is generated.

20. A system, comprising:
one or more processors; and
one or more memories, the one or more processors and the one or more memories being configured to:
obtain, from a client device, a context of the client device;
obtain, from a plurality of user interface object providers via a network, a plurality of user interface objects;

obtain contextual information, associated with the plurality of user interface objects, indicating one or more contexts in which the plurality of user interface objects are relevant,
wherein the contextual information comprises (i) a first context indicative of a venue in which a first user interface object of the plurality of user interface objects is relevant and determined based, at least in part, on first metadata maintained in one or more first fields of the first user interface object and (ii) a second context indicative of a time in which a second user interface object of the plurality of user interface objects is relevant and determined based, at least in part, on second metadata maintained in one or more second fields of the second user interface object,
wherein the first metadata is indicative of at least one of whether the user interacted with the first user interface object, a percentage of users that have interacted with the first user interface object, a priority of the first user interface object, an importance of the first user interface object, a priority of a first module within the first user interface object, or an importance of the first module within the first user interface object;
rank a set of the plurality of user interface objects based, at least in part, on the context of the client device and the contextual information associated with the plurality of user interface objects, wherein the ranking comprises determining a first rank of the first user interface object based, at least in part, on the context of the client device and the first context indicative of the venue in which the first user interface object is relevant; and
transmit content associated with the set of the plurality of user interface objects to the client device according to the ranking of the set of the plurality of user interface objects.

21. The system of claim 20, wherein obtaining, from the plurality of user interface object providers, a plurality of user interface objects comprises:
receiving at least one of the plurality of user interface objects from one or more servers via the Internet.

22. The system of claim 20, the one or more processors and the one or more memories being configured to:
receive, from at least one of the plurality of user interface object providers, ranking guidance in association with one of the plurality of user interface objects;
wherein the ranking the set of the plurality of user interface objects is performed based, at least in part, on the ranking guidance.

23. The system of claim 20, the one or more processors and the one or more memories being configured to:
receive a Uniform Resource Locator (URL) from at least one of the plurality of user interface object providers; and
retrieve one of the plurality of user interface objects via the URL.

24. The system of claim 20, wherein obtaining a plurality of user interface objects comprises:
receiving a template from at least one of the plurality of user interface object providers;
receiving second content from the one of the plurality of user interface object providers; and
generating one of the plurality of user interface objects based, at least in part, on the template and the second content.

25. The system of claim 20, the first user interface object having content associated therewith, wherein the first user interface object comprises computer-readable code for presenting the content associated with the first user interface object according to a particular layout.

26. The system as recited in claim 20, at least one of the plurality of user interface objects including content, a Uniform Resource Locator (URL), or a hypertext link.

27. The system as recited in claim 20, the one or more processors and the one or more memories being configured to:
determine a trustworthiness of each of the plurality of user interface object providers; and
rank the set of the plurality of user interface objects based, at least in part, on the trustworthiness of each of the plurality of user interface object providers.

* * * * *